United States Patent [19]

Yoshida

[11] 4,209,404
[45] Jun. 24, 1980

[54] FILTER PRESS

[75] Inventor: Takuji Yoshida, Osaka, Japan

[73] Assignees: NGK Insulators, Ltd., Nagoya; Noritake Iron Works Co., Ltd., Osaka, both of Japan

[21] Appl. No.: 928,962

[22] Filed: Jul. 28, 1978

Related U.S. Application Data

[63] Continuation of Ser. No. 807,173, Jun. 16, 1977, abandoned, which is a continuation of Ser. No. 679,439, Apr. 22, 1976, abandoned.

[30] Foreign Application Priority Data

May 22, 1975 [JP] Japan ................................. 50-61680

[51] Int. Cl.² ...................... B01D 25/12; B01D 25/38
[52] U.S. Cl. .................................. 210/225; 210/230; 210/236
[58] Field of Search ............... 210/225, 236, 384, 388, 210/224, 226-230

[56] References Cited

U.S. PATENT DOCUMENTS

| | | |
|---|---|---|
| 3,262,568 | 7/1966 | Zehrbach .......................... 210/388 X |
| 3,622,005 | 11/1971 | Kurita ................................... 210/225 |
| 3,647,082 | 3/1972 | Ishigaki .............................. 210/225 |
| 3,955,947 | 5/1976 | Hoon et al. ...................... 210/388 X |

FOREIGN PATENT DOCUMENTS 2158331  6/1972  Fed. Rep. of Germany ........... 210/225

*Primary Examiner*—Robert H. Spitzer
*Attorney, Agent, or Firm*—Stevens, Davis, Miller & Mosher

[57] ABSTRACT

A filter press comprising filter cake discharge means including hammers which give upper portions of filter cloths vibrations caused by circular movement of the hammers to facilitate discharge of filter cakes adhered to the filter cloths after filtration.

7 Claims, 2 Drawing Figures

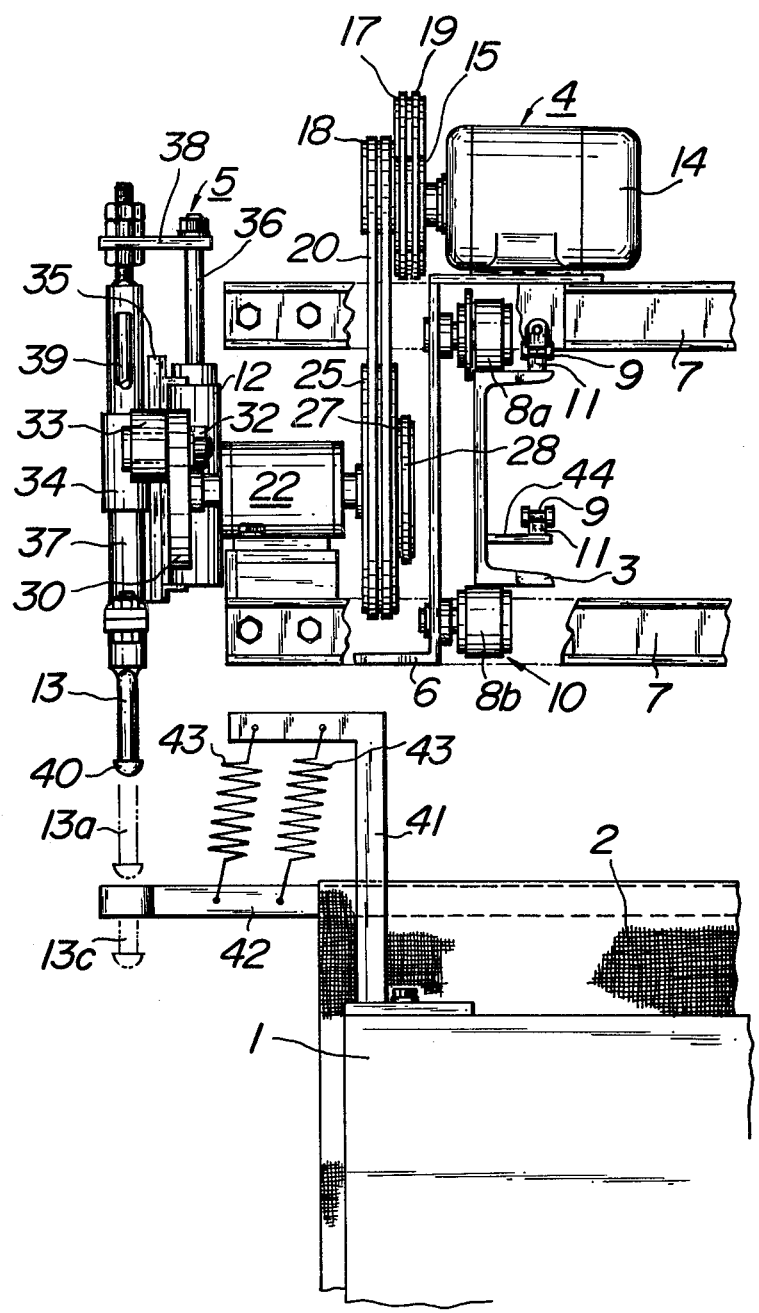
FIG_1

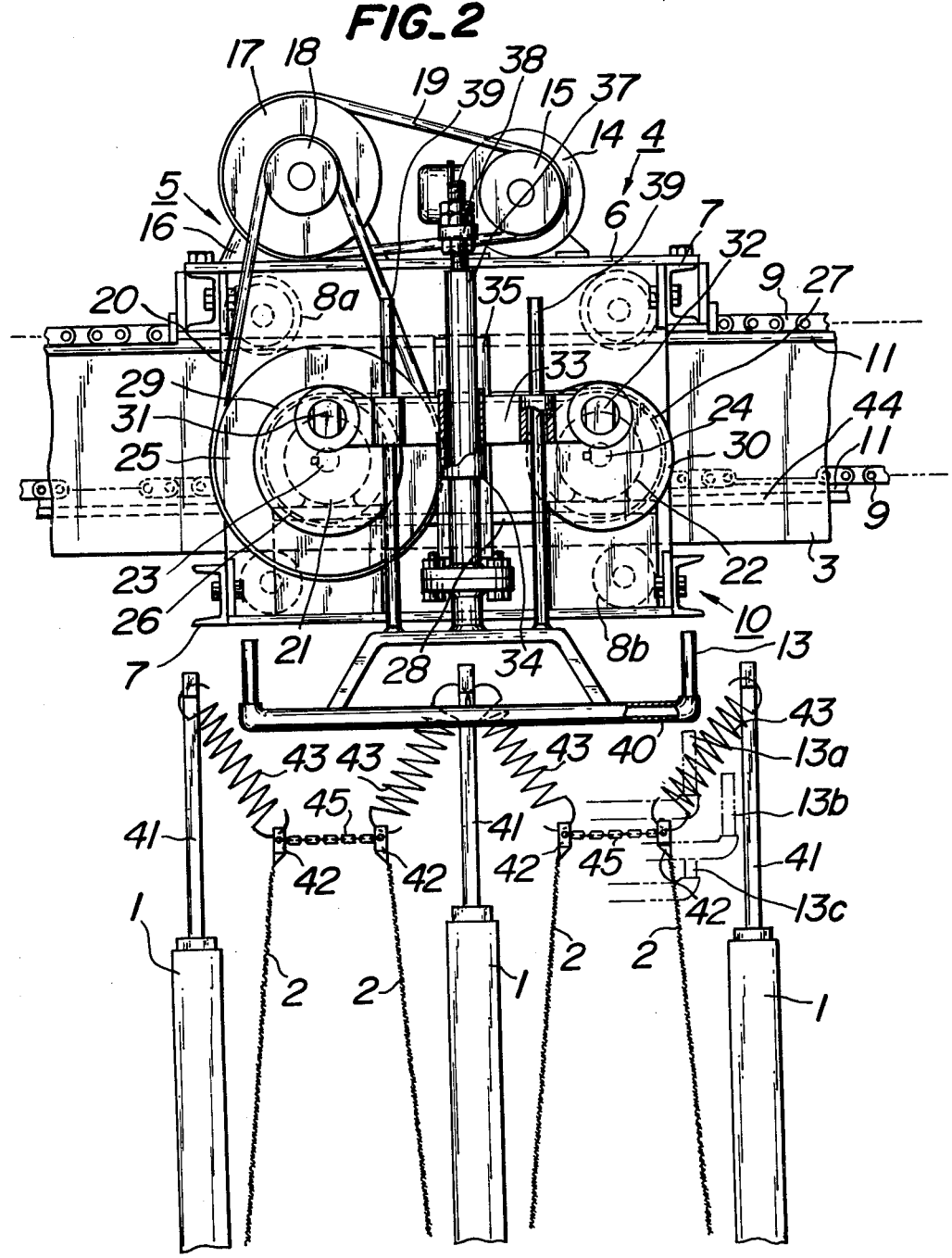

FILTER PRESS

This is a continuation of application Ser. No. 807,173, filed June 16, 1977, now abandoned, which was a continuation of application Ser. No. 679,439, filed Apr. 22, 1976, also now abandoned.

BACKGROUND OF THE INVENTION

1. Field of the Invention

The present invention relates to a filter press and more particularly to a filter press provided with filter cake discharge means to facilitate discharge of cakes from filter cloths after squeeze filtration.

2. Description of the Prior Art

After squeeze filtration by the use of a filter press, cakes adhered to filter cloths must be discharged as filter plates are opened. For this purpose in a conventional filter press of the type, an operator hits filter cloths or bars for hanging cloths with a hammer to cause vibrations in vertical directions in the filter cloths after filter plates have been returned or opened one by one. However, such vertical vibrations in the filter cloths are not sufficient to shake out the cakes adhered to the filter cloths. If the discharge of the cakes is incomplete, it is clear that the residual cakes adversely affect the following filtering operation.

SUMMARY OF THE INVENTION

An object of the present invention is to provide an improved filter press capable of discharging filter cakes with ease after squeeze filtration.

Another object of the present invention is to provide filter cake discharge means for facilitating discharge of filter cakes by subjecting the upper portions of filter cloths to vibrations caused by circular movements of hammer means.

The invention will be more fully understood by reference to the following detailed specification and claims taken in connection with the appended drawings.

BRIEF DESCRIPTION OF THE DRAWINGS

In the drawings, which illustrate the exemplary embodiment of the invention:

FIG. 1 is a front elevation of a main part of the filter cake discharge means incorporated in a filter press according to the invention; and FIG. 2 is a side elevation of the filter cake discharge means shown in FIG. 1.

DETAILED DESCRIPTION OF THE PREFERRED EMBODIMENT

The preferred embodiment of the filter press according to the invention will be explained in detail with reference to the following drawings. FIGS. 1 and 2 illustrate part of a filter cake discharge means incorporated in a filter press having a number of filter plates for the purpose of showing the operation for discharge of filter cakes after filtration. The filter press comprises a fast head, a movable head, a rear head, a pair of side bars arranged one on each side of the press (all the above components not shown in the drawings), and a number of filter plates slidably supported on the side bars by suitable means. The fast and rear heads have upstanding posts on which are supported two rails 3 having a channel or U-shaped section (only one shown in the drawings) on the upper portions of the sides of the filter press. On the rails 3 is arranged the filter cake discharge means 4 movable therealong above the filter plates 1 in directions parallel to the sliding movement of the filter plates.

The filter cake discharge means 4 comprises two vibrators 5 located one on each side thereof (only one shown) and movable frames 10 for supporting the respective vibrators 5 thereon. The movable frames 10 consist of bases 6 (only one shown) onto which the respective vibrators 5 are mounted and connecting members 7 for connecting the bases 6. Respectively two upper and lower rollers 8a and 8b extending inwardly provided on the base 6 are adapted to roll on the upper and lower horizontal surfaces of the rail 3. The upper connecting member 7 is provided at its lower ends with chain connecting pieces to which are connected ends of chains 9 to form endless chains through the movable frames 10. Each chain 9 extends along the upper horizontal surface of the rail 3 and a fixed plate 44 affixed to and extending from the inside of the web of the rail 3. With this arrangement, when the chains 9 are driven by a suitable means, the movable frames 10 and hence the filter cake discharge means 4 are moved along the rails 3 in either direction.

When the vibrator 5 is operated, a hammer 13 is lowered to a determined position by means of an air cylinder 12 and then driven into a circular movement in a vertical plane in parallel with the rails 3 by means of a motor 14. The motor 14 fixed onto the upper horizontal plate of the base 6 at one side thereof has an output shaft to which a pulley 15 is fixed. A pulley 17 and a pulley 18 having a smaller diameter than that of the pulley 17 fixed to each other are coaxially journaled in a bearing 16 fixed onto the upper horizontal plate on the other side. A V-belt 19 extends around the pulleys 15 and 17. Two bearings 21 and 22 are fixed to the lower horizontal plate of the base 6. A rotating shaft 23 is journaled in the bearing 21 and is provided at its inner end with a pulley 25 and a pulley 26 having a smaller diameter than that of the pulley 25 fixed therewith. A rotating shaft 24 is also journaled in the bearing 22 and comprises at its inner end with a pulley 26 fixed therewith having the same diameter as that of the pulley 26. A V-belt 20 extends around the pulley 18 and 25 and a V-belt 28 around the pulleys 26 and 27. To the outer ends of the rotating shafts 23 and 24 are fixed discs 29 and 30, respectively having the same diameter which are provided at the same location in the proximity of the outer peripheries thereof with stepped bolts 31 and 32 fixed thereto. The bolts 31 and 32 comprise larger diameter shanks which extend outwardly from the discs 29 and 30 and support the ends of a connecting rod 33. The connecting rod 33 is guided at the center by a rod guide 34 and is provided at its center with a cylinder receiving plate 35 fixed to the side of the rod facing inwardly. A cylinder rod 36 of the air cylinder 12 fixed to the cylinder receiving plate and a main rod 37 slidably lifting in the rod guide 34 are connected to each other by a connecting plate 38. The hammer 13 in the form of a round bar upwardly bent at its ends is fixed to the lower end of the main rod 37. To the hammer 13 are fixed two vertical rods 39 slidably movable through vertical rod guides provided in the connecting rod 33. The hammer 13 is generally made of a metal such as steel and covered with a sheath 40 of synthetic resin in order to increase frictional force of the surface thereof and guard the filter cloth from directly contacting the hammer 13.

A vibrator (not shown) mounted on the other end of the filter cake discharge means 4 is quite the same in construction.

Each of the filter plates 1 is provided at its upper ends with spring hanging frames 41 upstanding therefrom. The filter cloth 2 is held by a steel bar 42 having a length longer than the width of the filter cloth. The adjacent steel bars 42 are connected to each other by chains 45 and hung from the spring hanging frames 41 by springs 43 so that the adjacent filter cloths 2 are hung in the form of an inverted U-shape. FIG. 2 illustrates, the filter cloths in the open position when the filter plates 1 have been returned one by one into the open position after the squeeze filtration. When the squeeze filtration is being effected, the filter plates 1 are closed so that the filter cloths 2 extend in close contact with the surfaces of the filter plates.

The discharge of the cakes adhered to the filter cloths is carried out in the following manner. First the air cylinder 12 is actuated to lower the main rod 37 and hence the hammer 13 to the level in phantom lines 13a which is slightly above the upper portion of the filter cloth 2. The motor 14 is then energized to rotate the pulley 15 in one direction (normal direction). The rotating movement of the pulley 15 is transmitted to the pulley 25 through the V-belt 19, pulleys 17 and 18 and V-belt 20 while reducing the transmitted rotating speed. The rotating pulley 25 drives the pulley 27, so that the discs 29 and 30 rotate at the same rotating speed. The rotation of the discs 29 and 30 causes a circular movement of the connecting rod 33 in a normal direction keeping its horizontal position. Therefore the hammer 13 performs a circular movement in the normal direction in a vertical plane perpendicular to the surfaces of the filter cloths as shown in phantom lines 13b and 13c so that the hammer 13 hits the steel bars 42 at their ends while the frictional force of the hammer 13 causes vibrations of the steel bars in the traverse direction. At the same time, the motor of the vibrator, which is the same in construction as above mentioned, provided at the other end of the filter cake discharge means 4 is energized to drive the pulley 15 in the reverse direction, so that the hammer also performs its circular movement in a direction reverse to that of the hammer 13 before described. As a result, the filter cloths 2 are subjected to vibrations in vertical directions and to vibrations at their ends in traverse and opposite directions by the hammers on the opposite sides of the filter press. In other words, the filter cloths 2 are subjected to the torsional vibrations as well as the vertical vibrations. In conjunction with the resilient suspension of the filter cloths 2 by the springs 43 the vibrations of the filter cloths surely discharge or shake out the cakes adhered to the cloths 2. The torsional vibration in the traverse directions causes the filter cloths 2 to beat or hit the filter plates 1 to ensure the more effective removal of the cakes. It should be noted that even if the radius of the circular movement of the hammer 13 is relatively small, the effective vibrations can be obtained because the hammers are driven into the circular movement after they have been once lowered to the level in the proximity of the upper portions of the filter cloths. Consequently, the diameter of the discs 29 and 30 becomes smaller and therefore the entire vibrators become smaller.

In the above embodiment, the hammers of the two vibrators are driven in reverse directions. However, they may be driven in the same direction. In any cases, respective different rotating speeds may be employed for the respective vibrators. It has been found that the discharge of the cakes can be effected most effectively in case of employing the opposite directions of the circular movement and different rotating speeds. The number of the vibrators is not necessarily two. For example, instead of the two vibrators or in addition to them, one vibrator is arranged at the center of the connecting members 7 to give the central portion of the filter cloths the vibrational energy caused by the circular movement of the hammers.

The present invention is characterized in the fact that after the hammers 13 have been lowered to a determined level, the filter cloths are subjected to the vibrations caused by the circular movement of the hammers. The vibrators may be variously modified in construction so long as the vibration can be obtained for this purpose. For example, the vertical movement of the hammers may be effected by means of screw shafts or a rack and pinion system or other driving mechanism other than the air cylinder 12.

The invention of the present application can be applied to a filter press having a number of filter plates and a filter press having a number of filter plates and filter frames alternately arranged.

As can be seen from the above description the present invention provides an improved filter cake discharge means for securely removing the filter cakes attached to the filter cloths of filter presses.

While I have described and illustrated only one embodiment of the invention by those skilled in the art that after embodiments, as well as modifications of that disclosed, may be made and practiced without departing in any way from the spirit or scope of the invention, for the limits of which reference must be made to the appended claims.

What is claimed is:

1. A filter press apparatus comprising a plurality of adjacently stacked filter plates supported on a support means, a corresponding plurality of filter cloth support bars each bar being suspended above and generally between two adjacent filter plates for supporting a length of filter cloth hung in inverted U-shape between each two adjacent filter plates, said bars being longer than the width of said filter plates and being substantially horizontal and extending approximately perpendicular to the direction in which the plates open to separate from one another, with the ends of each bar extending beyond the width of the filter plates; at least two filter cake discharge means, one located at each side of the apparatus; means mounting each said filter cake discharge means for movement in a direction generally parallel to the direction in which the filter plates open; each discharge means including a hammer means and means for moving said hammer in a circular path wherein the hammer means hits and makes rubbing frictional contact with an end of at least one of said bars for thereby vibrating the bars in both vertical and horizontal directions for removing filter cakes from a filter cloth hung on said bars.

2. The filter press apparatus of claim 1, wherein the filter cake discharge means include means for moving their respective hammers through their respective circular paths in opposite rotary directions.

3. The filter press apparatus of claim 2, wherein the filter cake discharge means include means for moving their respective hammers through their respective circular paths at different rotary speeds.

4. The filter press apparatus of claim 1, wherein the filter cake discharge means include means for moving their respective hammers through their respective circular paths at different rotary speeds.

5. The filter press apparatus of claim 1, additionally comprising a length of filter cloth hung in inverted U-shape between adjacent filter plates, the length of said filter cloth support bars being longer than the width of said cloth.

6. The filter press apparatus of claim 1, wherein said hammer means is covered with a sheath of synthetic resin.

7. A filter press apparatus comprising a plurality of adjacently stacked filter plates supported on a support means; a corresponding plurality of filter cloth support bars each bar being suspended above and generally between two adjacent filter plates for supporting a length of filter cloth hung in inverted U-shape between each two adjacent filter plates, said bars being longer than the width of said filter plates and being substantially horizontal and extending approximately perpendicular to the direction in which the plates open to separate from one another, with the ends of each bar extending beyond the width of the filter plates; at least two filter cake discharge means, one located at each side of the apparatus; means mounting each said filter cake discharge means for movement in a direction generally parallel to the direction in which the filter plates open; each discharge means including a hammer means and means for moving said hammer in a circular path whereby the hammer means hits and makes rubbing frictional contact with an end of at least one of said bars for thereby vibrating the bars in both vertical and horizontal directions for removing filter cakes from a filter cloth hung on said bars, wherein said hammer means is mounted through adjusting means for adjusting positions of said hammer means in a vertical direction for controlling the lowermost position of the hammer means during operation thereof.

* * * * *